US007925423B2

(12) United States Patent
Howarter et al.

(10) Patent No.: US 7,925,423 B2
(45) Date of Patent: Apr. 12, 2011

(54) SYSTEM AND METHOD FOR TRAFFIC CONDITION DETECTION

(75) Inventors: Jamie C. Howarter, Overland Park, KS (US); Richard G. Bradford, Kansas City, MO (US)

(73) Assignee: Embarq Holdings Company, LLC, Overland Park, KS (US)

( * ) Notice: Subject to any disclaimer, the term of this patent is extended or adjusted under 35 U.S.C. 154(b) by 878 days.

(21) Appl. No.: 11/897,643

(22) Filed: Aug. 31, 2007

(65) Prior Publication Data

US 2009/0063030 A1 Mar. 5, 2009

(51) Int. Cl.
*G06F 19/00* (2006.01)

(52) U.S. Cl. ........................................................ 701/117

(58) Field of Classification Search .......... 701/117–119, 701/213, 300, 301; 340/435, 439, 539.13, 340/901–904, 933, 991, 995.13, 988
See application file for complete search history.

(56) References Cited

U.S. PATENT DOCUMENTS 5,146,215 A 9/1992 Drori
5,386,713 A 2/1995 Wilson
5,673,948 A 10/1997 Karpisek
5,693,987 A 12/1997 Krucoff
5,712,969 A 1/1998 Zimmermann et al.
5,768,539 A 6/1998 Metz et al.
5,801,753 A 9/1998 Eyer et al.
5,852,944 A 12/1998 Collard, Jr. et al.
5,894,320 A 4/1999 Vancelette
5,931,908 A 8/1999 Gerba et al.
5,937,065 A 8/1999 Simon et al.
5,940,072 A 8/1999 Jahanghir et al.
5,960,445 A 9/1999 Tamori et al.
5,978,855 A 11/1999 Metz et al.
6,040,851 A 3/2000 Cheng et al.
6,046,760 A 4/2000 Jun
6,075,863 A 6/2000 Krishnan et al.
6,088,051 A 7/2000 Barraud
6,138,271 A 10/2000 Keeley
6,175,861 B1 1/2001 Williams, Jr. et al.
6,195,797 B1 2/2001 Williams, Jr.
6,202,211 B1 3/2001 Williams, Jr.
6,246,434 B1 6/2001 Takashima
6,256,785 B1 7/2001 Klappert et al.
6,259,443 B1 7/2001 Williams, Jr.
6,331,876 B1 12/2001 Koster et al.
6,347,294 B1 2/2002 Booker et al.
6,424,947 B1 7/2002 Tsuria et al.
6,469,742 B1 10/2002 Trovato et al.
6,614,470 B1 9/2003 Manowitz et al.
6,618,754 B1 9/2003 Gosling
6,624,758 B1 9/2003 Omata et al.
6,637,029 B1 10/2003 Maissel et al.
6,654,835 B1 11/2003 Foster et al.
6,681,393 B1 1/2004 Bauminger et al.
6,684,403 B1 1/2004 Barraud
6,895,595 B2 5/2005 Goodman et al.
6,907,252 B2 6/2005 Papadias et al.
6,970,641 B1 11/2005 Pierre et al.
(Continued)

*Primary Examiner* — Kim T Nguyen
(74) *Attorney, Agent, or Firm* — SNR Denton US, LLP

(57) ABSTRACT

A system and method for detecting traffic conditions. Communications are performed wirelessly with a traffic detector. A determination is made whether a vehicle is approaching a traffic condition within safe parameters. A driver is alerted of the traffic condition in response to determining the vehicle is not approaching the traffic condition within the safe parameters.

20 Claims, 7 Drawing Sheets

U.S. PATENT DOCUMENTS

| | | | |
|---|---|---|---|
| 6,978,152 B1 | 12/2005 | Yamaashi et al. | |
| 7,003,783 B2 | 2/2006 | Skaringer et al. | |
| 7,027,768 B2 | 4/2006 | Hill | |
| 7,042,516 B2 | 5/2006 | Moriya et al. | |
| 7,069,578 B1 | 6/2006 | Prus et al. | |
| 7,072,950 B2 | 7/2006 | Toft | |
| 7,124,194 B2 | 10/2006 | Nathan et al. | |
| 7,200,683 B1 | 4/2007 | Wang et al. | |
| 2002/0164973 A1 | 11/2002 | Janik et al. | |
| 2005/0083211 A1 * | 4/2005 | Shafir et al. | 340/905 |
| 2007/0222638 A1 * | 9/2007 | Chen et al. | 340/901 |

* cited by examiner

SYSTEM AND METHOD FOR TRAFFIC CONDITION DETECTION

BACKGROUND

Car wrecks are one of the leading causes of death in the United States. Thousands of deaths occur each year on the streets, highways, roads, and Interstates. Accidents are especially common at intersections, school zones, construction zones, and other high risk areas. Many accidents occur because the driver is distracted by things such as eating food, applying makeup, listening to or adjusting the radio, talking on cell phones, and by other similar distractions and electronic devices.

In many cases, the victims of car accidents are travelers in other vehicles, pedestrians, and bystanders, as well as the driver and passengers of the vehicle that causes the accident. Fatalities and injuries continue to increase each year despite better signs, roadways, educational campaigns, safety equipment, and other improved technologies.

SUMMARY

One embodiment includes a system and method for detecting traffic conditions. Communications are performed wirelessly with a traffic detector. A determination is made whether a vehicle is approaching a traffic condition within safe parameters. A driver is alerted of the traffic condition in response to determining the vehicle is not approaching the traffic condition within the safe parameters.

Another embodiment includes a GPS-enabled wireless device for traffic condition detection. The device may include a wireless transceiver configured to communicate wirelessly with a traffic detector. The device may also include traffic logic configured to determine whether a vehicle in which the GPS-enabled wireless device is located is approaching a traffic condition within safe parameters. The device may further include a user interface configured to alert a driver of the traffic condition in response to determining the vehicle is not approaching the traffic condition within the safe parameters.

Yet another embodiment includes a GPS device. The GPS device may include a processor for executing a set of instructions configured to respond to traffic conditions. The GPS device may further include a memory for storing the set of instructions. The set of instructions may be configured to communicate wirelessly with one or more traffic detectors regarding traffic conditions, receive global positioning information, determine whether a vehicle is approaching a traffic condition within safe parameters in response to the global positioning information, and alert a driver of the traffic condition in response to determining the vehicle is not approaching the traffic condition within the safe parameters.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
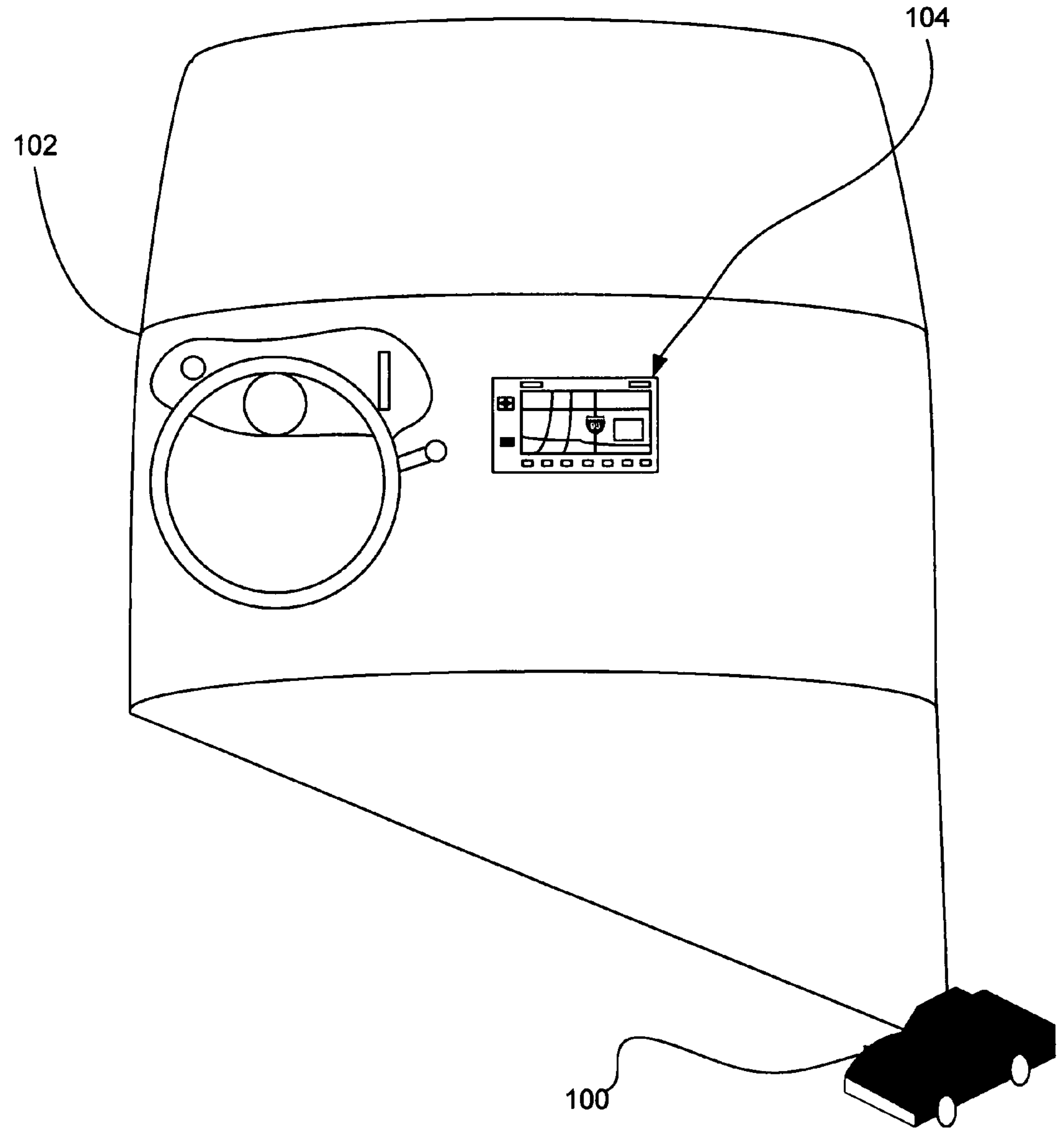
FIG. 1 is a pictorial representation of an in-car global positioning system in accordance with an illustrative embodiment.

FIG. 1 is a pictorial representation of an in-car global positioning system in accordance with an illustrative embodiment. FIG. 1 includes a vehicle 100, a dash 102, and a global positioning system (GPS) 104. The vehicle 100 may be a vehicle used to transport people and/or cargo illustratively shown as a car. However, the vehicle 100 may be any mobile device suitable for transportation of persons and goods. For example, the vehicle 100 may alternatively be a truck bus, train, boat, airplane, bicycle, or other mode of transportation.

The dash 102 is an expanded view of the inside of the vehicle 100. The dash 102 may be the portion of the vehicle 100 visible to one or more occupants of the vehicle 100 which may include a driver and/or one or more passengers. Although not explicitly shown, the dash 102 may include control mechanisms such as a steering wheel, turn signals, and other control elements of the vehicle 100. The dash 102 may also include any number of miscellaneous controls, including, but not limited to, gauges, environmental controls, music players, and other elements commonly included in vehicles. The dash 102 is shown because most in-car GPS systems are mounted in or atop the dash 102. However, the GPS 104 may be located in any location facilitating use by one or more passengers of the vehicle 100.

The GPS 104 may interface with the systems of the vehicle 100. For example, the GPS 104 may receive speed and directional information from a speedometer and vehicular compass for use when the global position signal is unavailable from global position satellites, such as in a tunnel, parking garage, or near mountains or buildings.

The GPS 104 may be a built-in, installed, hand-held, or mounted GPS unit. The GPS 104 and corresponding features, components, and hardware and software elements are further described in FIGS. 2 and 5. In addition, the GPS 104 may be configured to perform the standard features and functions of a global positioning device. The GPS 104 is enabled to communicate with any number of wireless elements, including traffic detectors. Traffic detectors are wireless transmitters configured to broadcast information and data relating to traffic conditions which may include intersections, reduced speed zones, accident scenes, emergency vehicles, construction zones, school zones, and other road conditions and events. Traffic conditions may be stationary, such as a stop light, or may change locations, such as a train.

Figure 2:
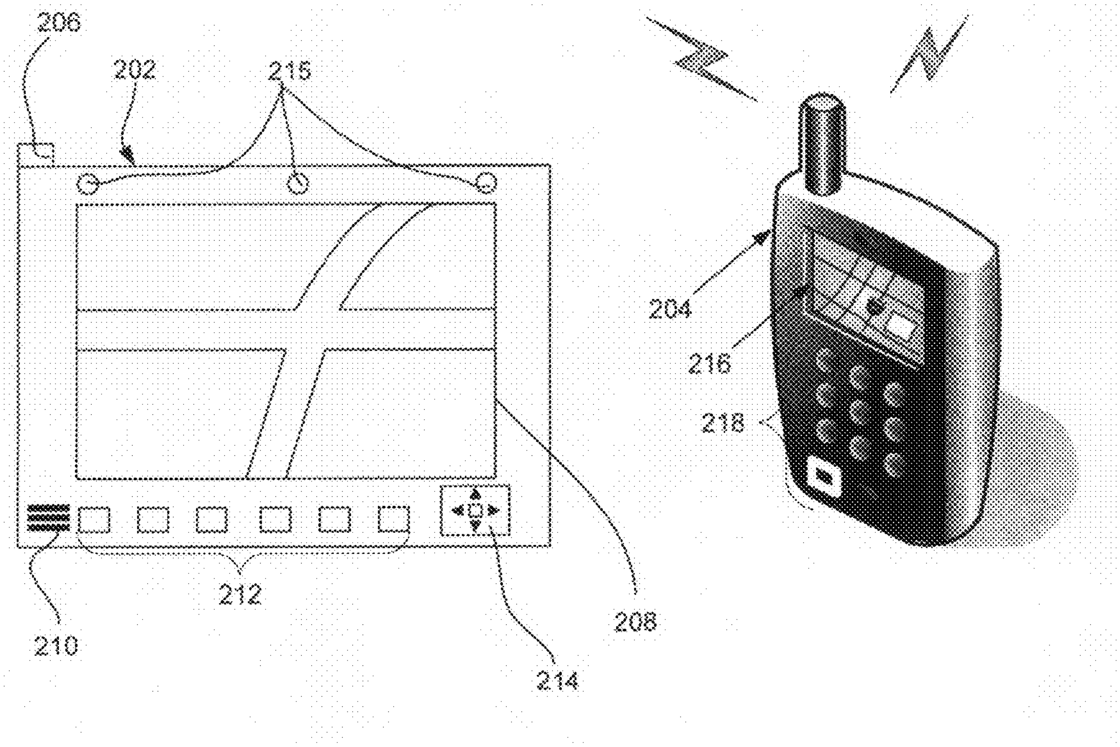
FIG. 2 is a pictorial representation of a GPS and a GPS-enabled wireless device in accordance with an illustrative embodiment.

FIG. 2 is a pictorial representation of a GPS and a GPS-enabled wireless device in accordance with an illustrative embodiment. FIG. 2 includes a GPS 202 and a wireless device 204. The GPS may be a vehicle integrated unit or an external GPS. Correspondingly, the GPS 202 may be built into the vehicle 100 of FIG. 1 or may be used or externally mounted in the vehicle. The GPS 202 may include an antenna 206, a display 208, a speaker 210, buttons 212, a selector 214, and an indicator 215. The wireless device 204 may include any elements of the GPS 202. The wireless device 204 includes a display 216 and inputs 218.

The GPS 202 and wireless device 204 may be equipped to communicate with the vehicle. For example, information regarding direction, speed, temperature, and other vehicle performance information may be exchanged between the systems of the vehicle and the GPS 202 and/or wireless device 204 wirelessly or using a hard connection. For example, a docking station or Bluetooth connection may allow the wireless device 204 to communicate with the computing systems of the vehicle.

The antenna 206 may be configured to receive data from global positioning satellites. The data is processed by the GPS 202 to provide an approximate location of the GPS 202 and the corresponding vehicle and/or user. The antenna 206 may also be used to send and receive wireless signals. The wireless signals may include a WiFi, WiMAX CDMA, GSM, GPRS, PCS, or other protocols, standards, formats, and signals suitable for sending and receiving wireless communications.

The display 208 may display text, graphics, pictures, video, and other interactive elements for guiding the user. In particular, the display 208 may display information regarding traffic conditions and provide visual alerts regarding the traffic conditions. For example, if the user is approaching an intersection with a red light, the display may flash or otherwise indicate to the user that the traffic light is red. The internal functions of the GPS 202 are further described in FIG. 5.

The speaker 210 may be used to output information and data to the user in an audio format. For example, the speaker 210 may be used to play music or provide step-by-step directions to a user. The speaker 210 may also be used to play auditory alerts to the user indicating a traffic condition is being approached. The auditory alert may verbally specify the nature of the traffic condition, location, severity, and a suggested action. For example, the speaker 210 may output an alert from the GPS 202 specifying that a train is coming and recommend the user slow the vehicle because there is not a marked railroad crossing. The GPS 202 may use text-to-speech and speech-to-text recognition for interacting with the user.

The buttons 212 may be used to receive user input. For example, the buttons 212 may allow a user to change views, enter an address or information, zoom in or out, or otherwise control the operation and functionality of the GPS 202. The selector 214 may also be used to provide user input and feedback for controlling and manipulating the GPS 202. In another embodiment, the GPS 202 may include one or more touch screens for controlling the GPS 202 and providing user input. For example, the display 208 may be a touch screen which may allow the user to control the different features of the GPS 202.

The indicators 215 may be configured to provide alerts or other prompts to the user. The indicators 215 and other interface elements of the GPS 202 may be programmed by the user to operate in accordance with the user preferences. In one example, the indicators 215 may be light emitting diodes that activate to indicate unsafe conditions exist ahead. In another example, lower pitch alerts that are more easily heard by older drivers may be emitted from the speaker 210. A higher pitch alert may be used for younger drivers. Similarly, a potential alert may be played by the GPS 202 based on the reaction time and experience of the driver. For example, a driver that has just turned sixteen may receive an alert before a driver with fifteen years of experience driving would be given the alert. A profile or preferences may be set for numerous drivers. The alert and GPS 202 may be used by the driver or any passenger within the vehicle to provide relevant traffic information and alerts. As a result, the vehicle or GPS 200 may request the driver's identity before enabling features of the GPS 200.

The wireless device 204 may be similarly enabled to perform the features and functions of the GPS 202. In particular, the display 216 may be configured to provide navigation information and traffic condition alerts and updates to the user in real time. The user may manipulate or access the inputs 218 to further control the information shown on the display 216 and to control the different functions of the wireless device 204. The wireless device 204 may be particularly useful to a user for allowing voice and data communications, as well as providing global position and traffic condition information.

The wireless device 204 may determine location, speed, and other positioning information using global positioning satellites or wireless triangulation from one or more towers broadcasting signals to the wireless device 204. The wireless device 204 may track the location of a user using GPS and/or cell-to-cell tracking currently used by wireless service providers. Similarly, the wireless device 204 may also be able to determine location based on the angle of approach to available cell towers, transmission time to one or more towers, and the strength of signal available to each of the corresponding cellular towers. The wireless device 204 may use the orbiting global positioning satellites in conjunction with triangulation and other wireless location determination schemes and methods. This combination of technologies may allow geographic information to be effectively determined despite dense foliage, large buildings, and other obstacles that may otherwise prevent wireless signals or GPS signals from reaching the wireless device 204.

Figure 3:
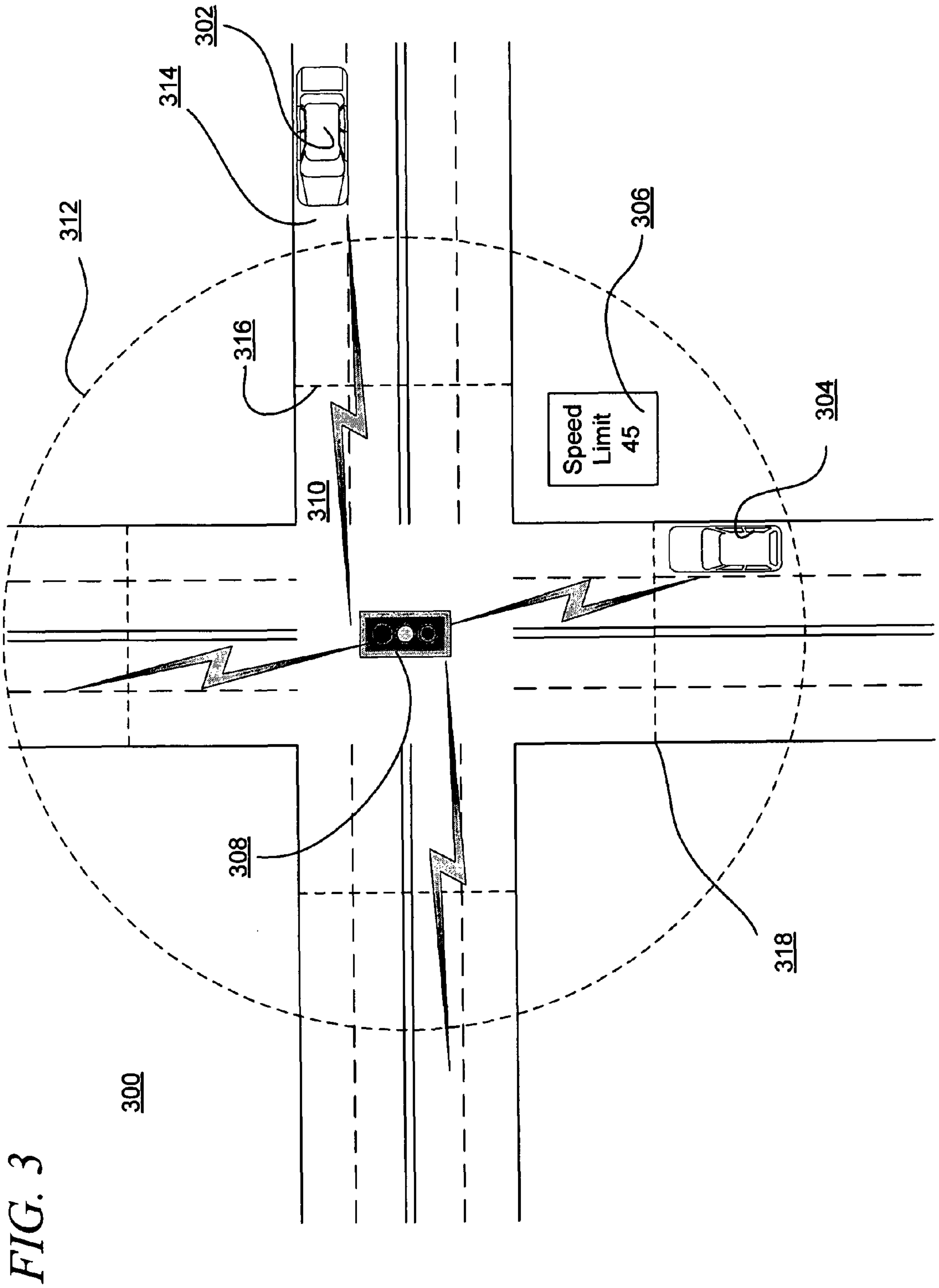
FIG. 3 is a pictorial representation of a wireless traffic environment in accordance with an illustrative embodiment.

FIG. 3 is a pictorial representation of a wireless traffic environment in accordance with an illustrative embodiment. FIG. 3 illustrates one embodiment of a wireless environment. The wireless environment 300 may include various elements including vehicles 302 and 304, a speed limit sign 306, a wireless stop light 308, a wireless signal 310, a wireless range 312, a roadway 314, and safety boundaries 316 and 318.

The vehicles 302 and 304 are a particular implementation of vehicle 100 of FIG. 1. In particular, the vehicle 302 may be carrying a GPS-enabled device, such as GPS 202 or wireless device 204 of FIG. 2. As a result, the vehicles 302 and 304 have global positioning information, as well as the speed and directional information that may be available from the vehicle's standard equipment, which may include speedometer, compass, temperature sensor, vehicle performance, and other standard features.

The wireless stop light 308 is one example of a traffic detector as previously defined. The wireless stop light 308 broadcasts the wireless signal 310 in many directions, as shown in FIG. 3. Alternatively, the wireless stop light 308 may directionally transmit the wireless signal 310 using a directional antenna or other similar transmission technology. In one embodiment, the wireless signal 310 may be a wireless signal, such as IEEE 802.11(n).

Alternatively, the wireless stop light 308 may broadcast using other wireless formats, protocols, and standards suitable for transmitting data to the vehicles 302 and 304. In another example, the wireless stop light 308 may broadcast a cellular signal, GMRS, or WiMAX for reception by the vehicles 302 and 304. As shown, the wireless stop light 308 may have a wireless range 312. The wireless range may indicate the maximum effective communications distance through which wireless signals 310 may be sent and received between the vehicles 302 and 304 and the wireless stop light 308. In one example, the wireless range 312 may have a maximum radius of transmission of 500 feet.

The speed limit sign 306 may display the maximum speed that the vehicles 302 and 304 may travel on the roadway 314. In other embodiments, the speed limit sign 306 may be replaced by static or dynamic signs indicative of traffic conditions, including precautions, alerts, and other information for safely navigating the roadway 314. As shown, vehicle 302 is not yet within the wireless range 312. As a result, the vehicle 302 has not yet sent or received information with the wireless stop light 308. For example, the vehicle 302 may have not received the wireless signal 310 indicating a green light for passing the wireless stop light 308.

The GPS devices within the vehicles 302 and 304 may be constantly searching for a signal from a traffic detector such as the wireless signal 310 transmitted from the wireless stop light 308. As shown, vehicle 304 is within the wireless range 312 and as a result, may receive the wireless signal 310. As the vehicle 304 enters the wireless range 312, the GPS device within the vehicle 304 establishes a link or communications session with the wireless stop light 308.

The wireless stop light 308 broadcasts information regarding light changes to the GPS or GPS-enabled wireless device in the vehicle 304. In another embodiment, the wireless stop light 308 may also broadcast location information for the wireless stop light 308, traffic load information, and other relevant data and information. The data and information transmitted by the wireless stop light 308 may be detected by sensor of or in communication with the wireless stop light 308, or from a central traffic office, wireless broadcaster, or other traffic condition detectors.

The GPS-enabled wireless device may be a cellular telephone, a laptop computer, an MP3 player, a PDA, or other electronic device enabled for GPS navigation and functionality. For example, if the vehicle 304 is approaching the wireless stop light 308 at a speed of 52 mph, and the wireless stop light 308 indicates a red light in the vehicle's direction, the GPS of the vehicle 304 may alert the driver that he or she is approaching a red light too quickly. For example, the driver of the vehicle 304 may be slightly distracted and may not notice that the wireless stop light 308 is red. As a result, the driver of the vehicle 304 may need to be notified that the wireless stop light 308 indicates that the driver must stop before entering the intersection. The location and speed of the vehicle 304 may be calculated by the GPS based on location information from both the vehicle 304 and/or the wireless stop light 308.

The GPS devices of the vehicles 302 and 304 may calculate safety boundaries 316 and 318 based on various factors. The factors may include the age and ability of the driver, the performance and condition of the vehicles 302 and 304, the driving conditions and any other factors that may influence whether the vehicles 302 and 304 may be able to stop if needed before entering the intersection marked by the wireless stop light 308. For example, based on the factors and safety parameters, the safety boundary 318 indicates a time at which the driver of the vehicle 304 should be given a warning in order not to run the red light or cause an accident. In another embodiment, the wireless stop light 308 or other traffic detector may transmit the safety boundaries 316 and 318 for subsequent use by the vehicles 302 and 304.

Once the vehicle 304 reaches the safety boundary 318 and has not yet stopped or slowed, the GPS device within the vehicle 304 may alert the driver of the circumstances. In one example, the GPS device may give a verbal warning such as "Stop light ahead." In another example, a GPS-enabled cellular phone may vibrate three times in rapid succession to indicate the danger the vehicle 304 and driver may face. The alert may be given at the safety boundaries 316 and 318 only if it is necessary for the vehicles 302 and 304 to slow, stop, or proceed with caution. If, for example, with vehicle 302, the wireless stop light 308 is green for the driver, no signal, alert or other information is passed along to the driver. The wireless signal 310 is used by the vehicle 304 in addition to other conditions, factors and circumstances to protect the vehicles 302 and 304, as well as pedestrians and other individuals that may be in close proximity to the roadway 314.

The GPS devices, personal devices of the driver or passengers, and vehicle systems may be integrated or communicate within the vehicle. As a result, alerts or other information may be conveyed though vehicle systems. For example, the car's audio system which may include a stereo may be used to play auditory alerts to the driver and/or passengers. Similarly, the seat may be set to vibrate. A heads-up display may also display information from the GPS that may be more easily understood for the user for added security and efficiency. In another example, an alert may also be played through the driver's mp3 player or personal entertainment device.

Figure 4:
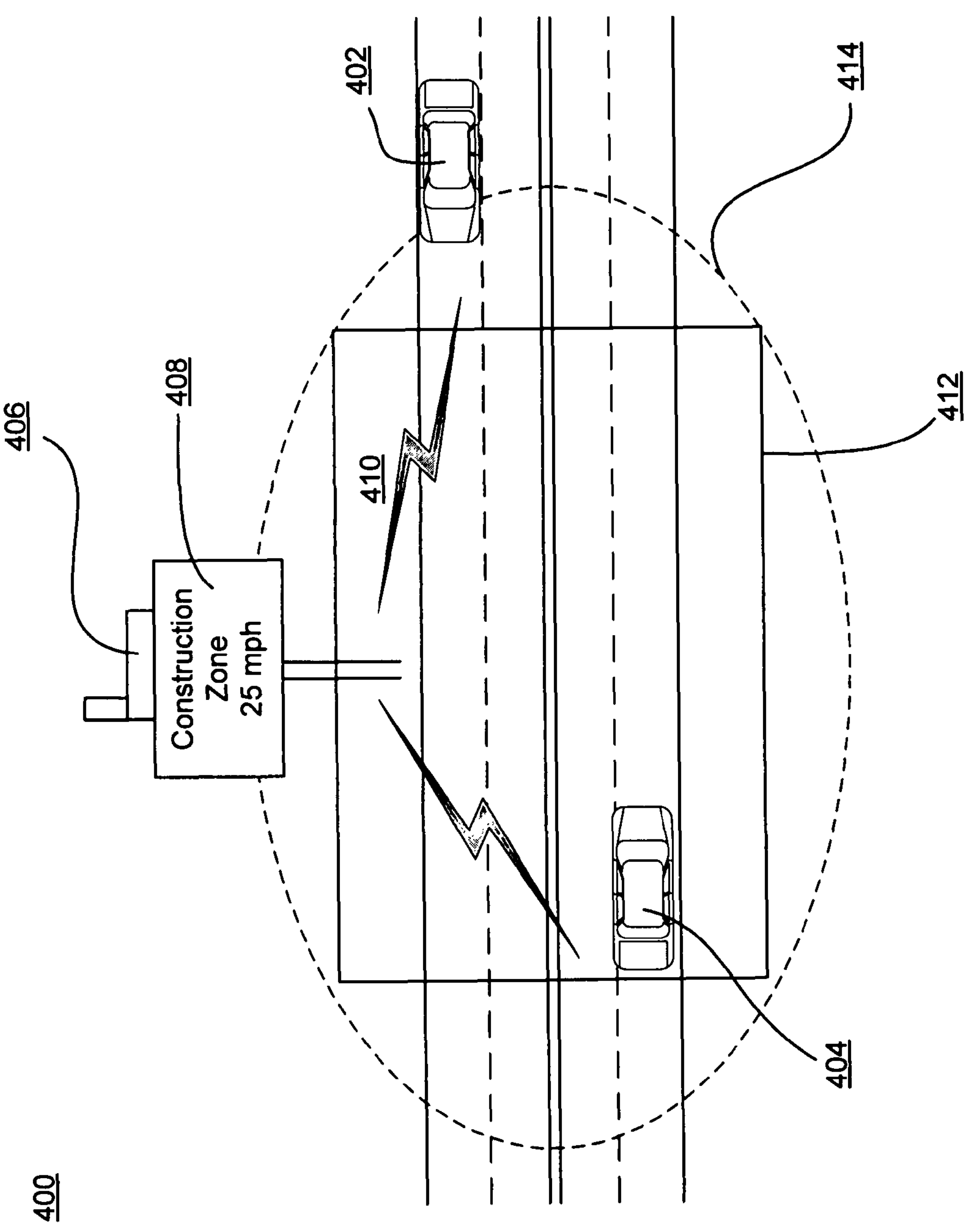
FIG. 4 is a pictorial representation of a wireless traffic zone in accordance with an illustrative embodiment.

FIG. 4 is a pictorial representation of a wireless traffic zone in accordance with an illustrative embodiment. FIG. 4 illustrates a wireless traffic zone 400. The wireless traffic zone includes vehicles 402 and 404, a traffic detector 406, a sign 408, a wireless signal 410, a construction zone 412, and a wireless range 414.

The traffic detector 406 may be used to temporarily or permanently transmit the wireless signal 410. In one example, the traffic detector 406 may be a solar-powered device connected to the sign 408 for informing the vehicles 402 and 404 that they are entering the construction zone 412. In another embodiment, the traffic detector 406 may be part of an emergency response vehicle or individual car. For example, the traffic detector 406 may be configured to transmit the wireless signal 410 from a police vehicle in response to arriving at the scene of a traffic accident. The wireless signal may inform the vehicles 402 and 404 that the driver should proceed with caution, suggest alternative routes, or provide other suggested actions to the vehicles 402 and 404.

As shown, the vehicles 402 and 404 may be traveling well in excess of the 25 mph speed limit required for the construction zone as specified by the sign 408. As a result, the traffic detector 406 may broadcast a wireless signal 410 to inform the vehicles and corresponding GPS devices and drivers that the speed of the vehicles 402 and 404 should be reduced to 25 mph. The traffic detector 406 may be more effective than the sign 408 because the drivers of each vehicle may specify how alerts or other information are to be received, further enhancing communications exchange. Additionally, even if the vehicles pass the sign 408, the GPS devices may continue to warn the drivers of the construction zone 412.

Once the vehicles 402 and 404 enter the wireless range 414, the GPS devices of the vehicles 402 and 404 may receive the wireless signal 410 and alert the drivers of the upcoming construction zone 412. The result of the information exchange between the traffic detector 406 and the vehicles 402 and 404 is increased safety for construction workers within the construction zone 412 and the vehicles 402 and 404 and corresponding passengers.

In another embodiment, two traffic detectors may be located at both ends of the construction zone 412 for more accurately informing the GPS device when the vehicle enters and leaves the construction zone 412. One or more traffic detectors may be used for more complex driving conditions and when more safety information and wireless coverage is necessary. The traffic detectors may broadcast start and stop locations for the construction zone in latitude and longitude, the speed limit within the construction zone and the duration or length of the construction zone. For example, during particularly long construction zones, the drivers of the vehicles 402 and 404 may forget the posted speed limit or that they are in a construction zone.

Figure 5:
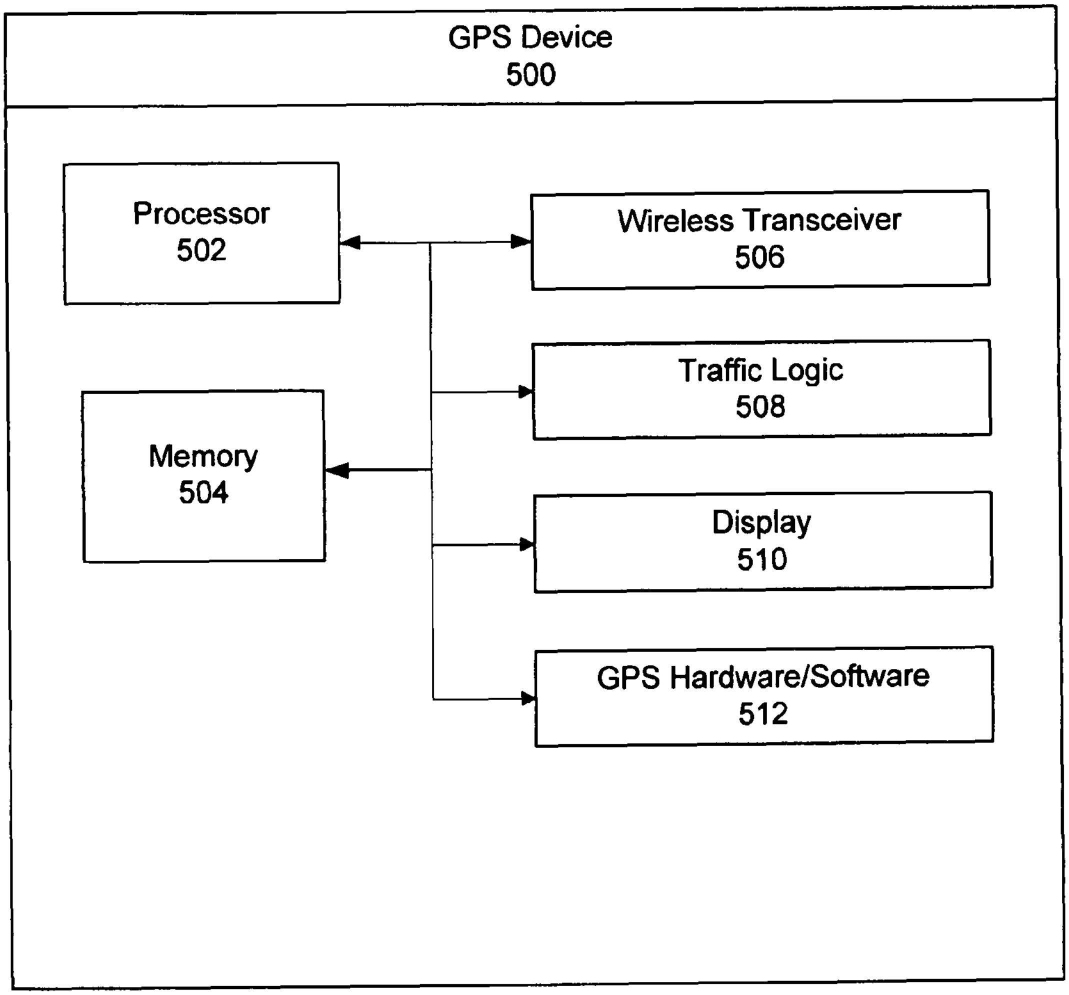
FIG. 5 is a block diagram of a GPS device in accordance with an illustrative embodiment.

FIG. 5 is a block diagram of a GPS device in accordance with an illustrative embodiment. FIG. 5 includes a GPS device 500 specifically used for navigation or with global positioning capabilities. The GPS device 500 is a particular implementation of the GPS 202 and wireless device 204 of FIG. 2. The GPS device 500 may include a processor 502, memory 504, wireless transceiver 506, traffic logic 508, display 510, and GPS hardware/software 512. The GPS device 500 may be a combination of hardware and software elements and may use various structures and formats. The example shown in FIG. 5 is given only for illustration purposes, and not as a limitation of required elements.

The processor 502 may be a digital processing unit. The processor 502 may also be any processing device suitable for executing applications, manipulating data, and processing instructions and communications signals. For example, the processor 502 may be a computer processor or wireless device processor.

The memory 504 may be a memory device for storing data, for example, the hard drive, or flash memory for storing information or data. However, the memory 504 may be any dynamic, static, volatile, or non-volatile memory type or configuration suitable for storing and accessing electronic information and data. The memory 504 may store navigation information, maps, user preferences, traffic condition data, frequency information, and other relevant data, applications, and information.

The wireless transceiver 506 may include a transmitter and receiver for communicating any number of wireless signals. For example, the wireless transceiver 506 may communicate using WiFi, WiMAX, CDMA, GSM or other wireless protocols or standards. In particular, the wireless transceiver 506 may communicate with traffic detectors. In one embodiment, the wireless transceiver 506 may constantly scan or search for signals from traffic detectors. The wireless transceiver 506 may also communicate with a wireless network for receiving traffic information.

The traffic logic 508 may be the logic for determining whether a dangerous condition exists, whether an alert should be generated, and otherwise interacting with multiple traffic detectors and the user through the display 510. In another embodiment, the traffic logic 508 may be integrated with the processor 502. In one example, the traffic logic may determine safety boundaries for the specified driver based on traffic, environment, driver, and other available information.

The traffic logic 508 may perform speed calculations, determine intersection points, compare historical data, make recommendations, control alarms and information output to the user, and reroute the driver as needed. The traffic logic 508 may have access to traffic information and details through a wireless carrier, such as a cellular telephone service provider. The traffic logic 508 may also include look up tables, databases, and historical information for determining the best response to a traffic condition. For example, if there is a wreck ahead, the traffic logic 508 may send information to the user through the display 510 suggesting the driver use a feeder road paralleling the current roadway. In another example, the user may use performance information about the car's brakes, the current slick weather conditions as broadcast from a weather station, and the driver's experience level to indicate the user should immediately begin slowing at five miles per hour to give the driver time to slow to a safe driving speed before entering an occupied school crossing.

The traffic logic 508 may also make recommendations based on previous experiences. For example, the traffic logic 508 may suggest a new route in order to avoid school zones that broadcast a reduced speed limit during specific times of day in order to travel from one point to another much faster. In one embodiment, the traffic logic 508 may process information from multiple traffic lights to suggest a speed within the speed limit that allows the driver to pass through the multiple traffic lights without being stopped thereby conserving gasoline, battery power, and the patience of the driver.

In another embodiment, the GPS device 500 may be unable to detect traffic detectors, but a wireless device of the user, such as a cellular phone, may be able to communicate with the traffic detectors. As a result, the wireless device may transmit information to the GPS device 500 to be displayed to the user. In one example, the wireless transceiver 506 may use Bluetooth® to communicate with a wireless device. The wireless transceiver 506 may also communicate with an external alert or speaker specifically designed to transmit and play an alert to the driver.

The display 510 may be configured to visually display information to the user. In one example, the display 510 is an LCD screen or touch screen for displaying information, maps, alerts, text, and other information to the user and receiving user input. The display 510 may flash an alert or otherwise provide an alert to the driver. The GPS hardware/software 512 may be the hardware and software that enables the standard features of the GPS device.

In another embodiment, the memory 504 may store instructions, applications, or modules for implementing the features of the GPS device 500 as herein described. For example, the wireless transceiver 506, traffic logic, 508, display 510, and GPS hardware/software may be software modules that interact with the hardware elements of the GPS device 500.

Figure 6:
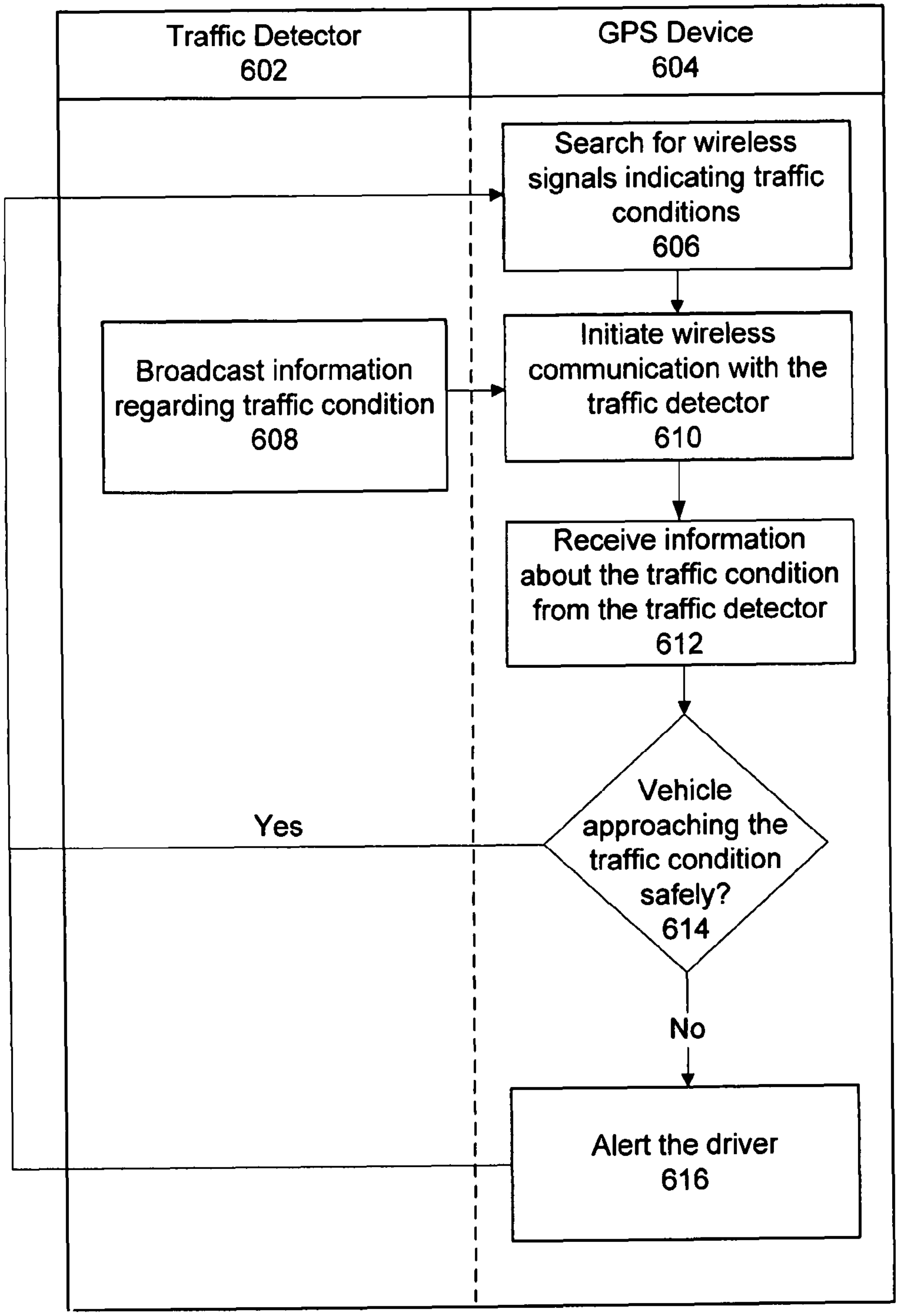
FIG. 6 is a flowchart of a process for providing traffic alerts in accordance with an illustrative embodiment.

FIG. 6 is a flowchart of a process for providing traffic alerts in accordance with an illustrative embodiment. The process of FIG. 6 may be implemented by a traffic detector 602 and a GPS device 604. The traffic detector 602 may be a permanently attached device or may be a temporary device positioned for a short-term or ongoing event or happening, such as a school fair or a traffic accident. The GPS device 604 may be a vehicle embedded GPS, an external GPS, or a GPS-enabled wireless device.

The process of FIG. 6 begins with the GPS device 604 searching for wireless signals indicating traffic conditions (step 606). The GPS device 604 may search for wireless signals by constantly monitoring the signal strength and availability of signals as detected. The traffic detector broadcasts information regarding traffic conditions (step 608). The traffic detector 602 may be constantly broadcasting traffic condition information or may do so only when circumstances require. For example, a police car enabled with a traffic detector 602 may only broadcast a signal indicating a wreck has occurred once activated by the police officer.

Next, the GPS device 604 initiates wireless communication with the traffic detector 602. The communication of step 610 may involve establishing a communications session or wireless network link between the GPS device 604 and the traffic detector 602. The GPS device 604 and traffic detector 602 may communicate using a signal channel, or radio frequency specially designated for sending and receiving traffic information or via another designated communications frequency.

Next, the GPS device 604 receives information about the traffic condition from the traffic detector (step 612). The information may specify the location, current distance, seriousness, and the result or actions that the GPS device 604 and/or driver of a vehicle should take in order to safely navigate the roadway or area proximate to the traffic condition.

The GPS device 604 determines whether the vehicle is approaching the traffic condition safely (step 614). The determination of step 614 may be based on safety parameters and factors regarding the vehicle, driver, environmental conditions, and traffic conditions. The determination may also be made on the information received from the traffic detector in step 612. In another embodiment, the traffic detector may determine whether the vehicle is approaching the traffic condition safely and then transmit relevant information to the GPS for display to the driver.

If the GPS device 604 determines the vehicle is approaching the traffic condition safely in step 614, the GPS device 604 returns to search for wireless signals indicating traffic conditions (step 606). If the GPS device 604 determines the vehicle is not approaching the traffic condition safely in step 614, the GPS device 604 alerts the driver (step 616). For example, if the driver is a relatively inexperienced 16-year old driver who is driving in the rain toward a semi-truck accident, the GPS device 604 may give an earlier than normal warning of the situation to the driver to ensure the safety of the driver, emergency personnel, and other individuals that may be in the proximity of the traffic condition.

The alert in step 616 may provide additional information to the driver, a plan of action, or other feedback that may protect the driver, bystanders, and other individuals. The alert 616 may include an audiovisual tactile or other alert to provide the driver information. For example, the vehicle seat may be set to vibrate or rumble to indicate to the driver that the vehicle is approaching a school zone. Alternatively, the alert may include a message specifying the upcoming traffic condition, such as "car wreck ahead" for routing purposes.

The wireless enabled GPS device or smart map technology may provide additional information and safety for drivers, pedestrians, and others that come in close proximity to roadways and vehicles. Wireless information exchanged between vehicles and traffic detectors may ensure that accurate information and alerts are exchanged for protecting the drivers.

Figure 7:
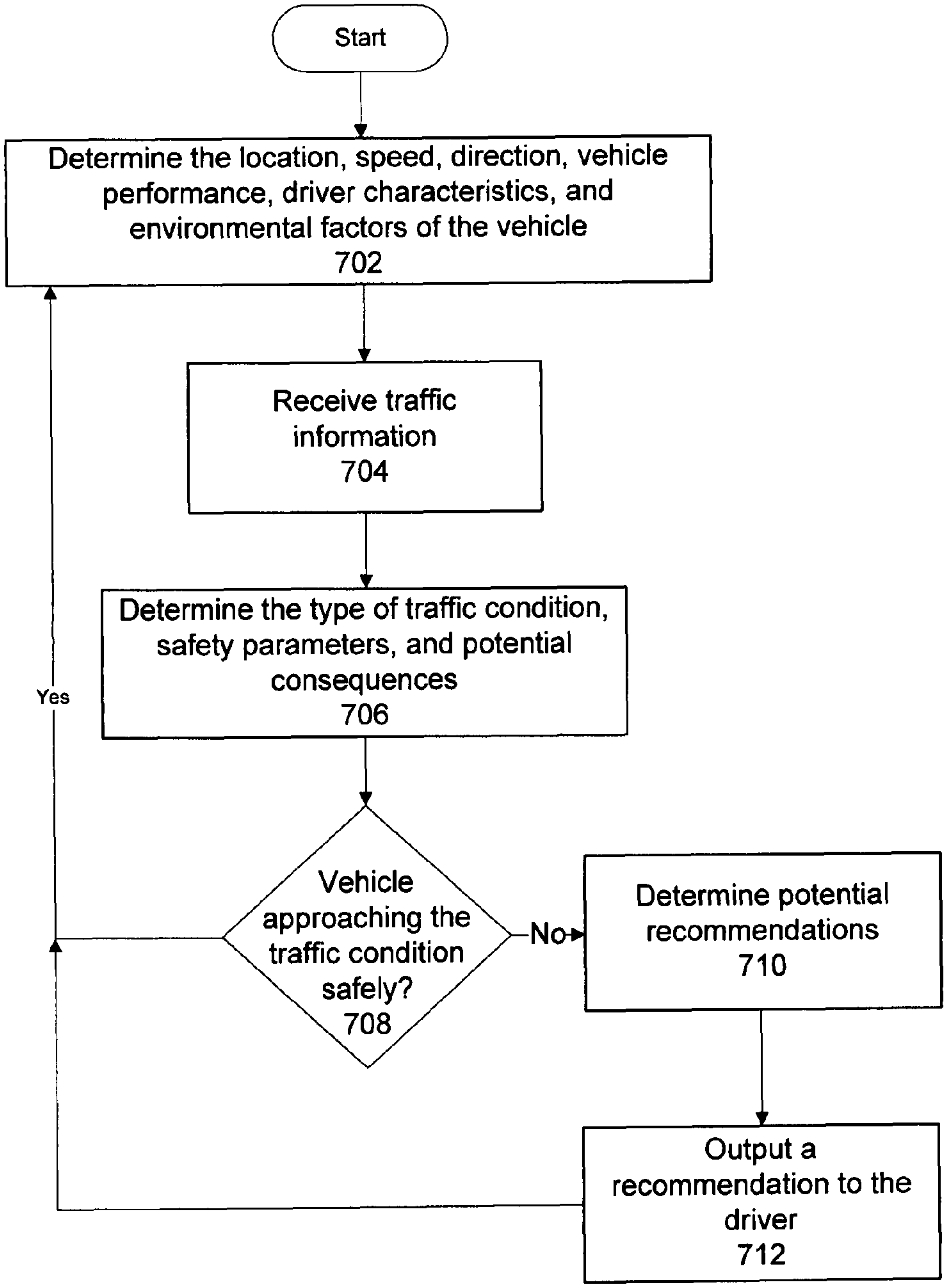
FIG. 7 is a flowchart of a process for making recommendations for traffic conditions in accordance with an illustrative embodiment.

FIG. 7 is a flowchart of a process for making recommendations for traffic conditions in accordance with an illustrative embodiment. The process of FIG. 7 may be implemented by traffic logic which may include hardware or software of a GPS or GPS-enabled wireless device.

The process may begin by determining the location, speed, direction, vehicle performance, driver characteristics, and environmental factors of the vehicle (step 702). The process of step 702 may be performed or sampled in real-time or at specified intervals in the event that a quick response needs to be made to an upcoming traffic condition. The data of step 702 may be generated or received by the GPS hardware and software of the device, vehicle systems, accessible user profiles, and informational broadcasts. The data may be updated in a matrix or other system for indicating all relevant factors.

Next, the traffic logic receives traffic information (step 704). The traffic information may be received from a traffic detector which may be in motion or stationary. In one example for illustration purposes, a police vehicle equipped with a traffic detector may be chasing a vehicle that is traveling the wrong way along an interstate and broadcasting a warning signal to vehicles in danger. The traffic information of step 704 may be a signal from the traffic detector specifying the type of traffic detector, location, importance, and other relevant characteristics or information. In another example for illustration purposes, a school crossing guard may be wearing a transmitter that indicates a school crossing is upcoming and that children are crossing the street in front of the vehicle or driver.

Next, the traffic logic determines the type of traffic conditions, safety parameters, and potential consequences (step 706). The type of traffic condition mayor may not be broadcast in the traffic information of step 704. A code or other indicator may also be used to determine the type of traffic condition. For example, traffic lights, stop signs, crosswalks, wrecks, and school zones may all have an alphanumeric indicator that is broadcast as part of the signal. In one embodiment, the safety parameters may be retrieved from a database, such as federal or state driving guidelines or policies.

In another embodiment, the safety parameters may be set by the driver or a person with administrative access to the vehicle. For example, a parent may stipulate that the traffic logic provide extra cautious safety parameters to new teenage drivers. The potential consequences may specify what may happen if the driver or vehicle fails to slow, divert, or take some specified action. For example, the driver may be subject to a fine or may be in danger of causing an accident or otherwise harming him/herself, the passengers, and others within close proximity to the roadway.

For example, with a driver driving the wrong way down the interstate, the safety parameters may stipulate that the only safe circumstances are for a driver to pull far into the right median of the road and stop the vehicle or the driver may be involved in a wreck with the other errant driver.

Next, the traffic logic determines whether the vehicle is approaching the traffic condition safely (step 708). The determination of step 708 may be made based on the information from steps 702-706. Calculations, comparisons, and other analyses may be made by the traffic logic. For example, distances between the vehicle and traffic detector, as well as relative speeds may be used to make the determination. The traffic logic may use any number of databases, tables, matrices, or other information to quickly make the determination of step 708. For example, if the user is approaching a school crosswalk at 65 mph, the traffic logic may determine the vehicle is not approaching the traffic condition safely.

If the vehicle is approaching the traffic condition safely, the traffic logic returns to determine the location, speed, direction, vehicle performance, driver characteristics, and environmental factors of the vehicle (step 702). If the vehicle unsafely approaching the traffic condition in step 708, the traffic logic determines potential recommendations (step 710). The potential recommendations may be set by default, previously programmed, or otherwise specified. In one example, the potential recommendations may include displaying a simple alert or information indicator to the driver or user of the GPS-enabled device. For example, as the driver approaches the crosswalk, the traffic logic may potentially recommend the driver slow down or take an alternative route.

Next, traffic logic outputs a recommendation to the driver (step 712). The recommendation chosen from the potential recommendations may be made based upon the applicable laws and regulations, historical information, and preferences of the driver. The recommendation may also be broadcast from the traffic detector. For example, the police car chasing the vehicle going the wrong way may have manually broadcast a signal informing all drivers to stop in the lane in which they are currently driving.

The recommendation may be displayed, played in a message, or as an alarm. For example, the user may have designated tones or alerts for speeding up, slowing down, or taking evasive action. The recommendation may be received by the driver or another passenger in the vehicle carrying a GPS-enabled device.

The previous detailed description is of a small number of embodiments for implementing the invention and is not intended to be limiting in scope. The following claims set forth a number of the embodiments of the invention disclosed with greater particularity.

What is claimed:

1. A method for detecting traffic conditions, the method comprising:

communicating wirelessly with a traffic detector;

determining safe parameters for approaching a traffic condition associated with the traffic detector, the safe parameters include driving conditions, vehicle characteristics, and a user profile associated with a driver of the vehicle;

determining whether the vehicle is approaching the traffic condition within the safe parameters, wherein the vehicle characteristics are enabled to be determined utilizing a global positioning system and wireless triangulation; and alerting the driver of the traffic condition in response to determining the vehicle is not approaching the traffic condition within the safe parameters.

2. The method according to claim 1, wherein the communication comprises:

searching for one or more traffic detectors;

detecting the traffic detector; and establishing a wireless link with the traffic detector.

3. The method according to claim 2, wherein the safe parameters are safety boundaries automatically calculated utilizing the driving conditions, the vehicle characteristics, and the user profile, wherein the wireless link is any of a WiFi connection and a WiMAX connection.

4. The method according to claim 1, wherein the traffic condition is enabled to be a stationary condition and a moving condition, and wherein the traffic condition is any of an intersection, traffic accident, school zone, construction zone, and train crossing.

5. The method according to claim 1, further comprising:

determining an identity of the driver for associating the user profile with the driver from a plurality of profiles, wherein the user profile is set by an administrator for a young driver or an inexperienced driver.

6. The method according to claim 1, further comprising:

broadcasting a signal as the traffic detector in response to detecting the traffic condition or discovering a new traffic condition.

7. The method according to claim 1, wherein the alerting comprises:

sounding an auditory alert to the driver.

8. The method according to claim 7, wherein the auditory alert is a message explaining the traffic condition to the driver, and wherein the auditory alert is communicated to one or more wireless devices within the vehicle.

9. The method according to claim 1, wherein the communicating, determining, and alerting are performed by a global positioning system (GPS) or a GPS-enabled wireless communication device.

10. A GPS-enabled wireless device for traffic condition detection comprising:

a wireless transceiver configured to communicate wirelessly with a traffic detector, the traffic detector indicates a traffic condition;

traffic logic configured to determine whether a vehicle in which the GPS-enabled wireless device is located is approaching the traffic condition within safe parameters, the safe parameters include driving conditions, vehicle characteristics, and a user profile associated with a driver of the vehicle;

a user interface configured to alert a driver of the traffic condition in response to determining the vehicle is not approaching the traffic condition within the safe parameters.

11. The GPS-enabled wireless device according to claim 10, wherein the GPS-enabled wireless device is enabled to utilize wireless triangulation and global positioning satellites to determine global positioning information.

12. The GPS-enabled wireless device according to claim 10, wherein a memory stores user preferences for allowing the user to receive information and alerts.

13. The GPS-enabled wireless device according to claim 10, wherein the user profile is determined in response to the user entering the vehicle.

14. The GPS-enabled wireless device according to claim 10, wherein the wireless transceiver broadcasts a signal as a traffic detector in response to an accident or user activation.

15. The GPS-enabled wireless device according to claim 10, wherein the wireless transceiver receives data through a cellular communications protocol.

16. A GPS device comprising:

a processor for executing a set of instructions configured to respond to traffic conditions; and a memory for storing the set of instructions, wherein the set of instructions are configured to communicate wirelessly with one or more traffic detectors regarding the traffic conditions, receive global positioning information, determine whether a vehicle is approaching a traffic condition within safe parameters in response to the global positioning information, wherein the safe parameters include driving conditions, vehicle characteristics, and a user profile associated with a driver of the vehicle, and alerts the driver of the traffic condition in response to determining the vehicle is not approaching the traffic condition within the safe parameters.

17. The GPS device according to claim 16, wherein the GPS device is any of a vehicle-mounted device, a portable GPS device, and a GPS-enabled wireless telephone, and wherein the GPS device is enabled to utilize global positioning information and wireless triangulation.

18. The GPS device according to claim 16, wherein the communication occurs between the transceiver and the one or more traffic detectors using a high-speed data link.

19. The GPS device according to claim 16, wherein the safe parameters are determined based on speed, direction, drivers abilities, environmental factors, and vehicle condition.

20. The GPS device according to claim 16, wherein the set of instructions are broadcast as a signal from the one or more traffic detectors for warning other GPS devices of the traffic condition.

* * * * *